US012502647B2

(12) United States Patent
Coton

(10) Patent No.: US 12,502,647 B2
(45) Date of Patent: Dec. 23, 2025

(54) MULTI-BRANCH STATIC MIXERS

(71) Applicant: MERCK PATENT GMBH, Darmstadt (DE)

(72) Inventor: Thomas Coton, Illkirch-Graffenstaden (FR)

(73) Assignee: Merck Patent GmbH, Darmstadt (DE)

( * ) Notice: Subject to any disclaimer, the term of this patent is extended or adjusted under 35 U.S.C. 154(b) by 889 days.

(21) Appl. No.: 17/762,464

(22) PCT Filed: Nov. 25, 2020

(86) PCT No.: PCT/EP2020/083272
§ 371 (c)(1),
(2) Date: Mar. 22, 2022

(87) PCT Pub. No.: WO2021/105153
PCT Pub. Date: Jun. 3, 2021

(65) Prior Publication Data

US 2022/0362725 A1 Nov. 17, 2022

(30) Foreign Application Priority Data

Nov. 29, 2019 (EP) .................................... 19306541

(51) Int. Cl.
*B01F 25/00* (2022.01)
*B01F 25/432* (2022.01)
*B01F 33/81* (2022.01)

(52) U.S. Cl.
CPC ........ *B01F 25/4323* (2022.01); *B01F 33/811* (2022.01); *B01F 33/813* (2022.01)

(58) Field of Classification Search
CPC ... B01F 25/4323; B01F 33/813; B01F 33/811
See application file for complete search history.

(56) References Cited

U.S. PATENT DOCUMENTS 5,427,946 A * 6/1995 Kricka ................. B01J 19/0046
435/259
2011/0165025 A1 7/2011 Gransee et al.
(Continued)

FOREIGN PATENT DOCUMENTS

CN 201959734 U 9/2011
CN 106422924 A 2/2017
(Continued)

OTHER PUBLICATIONS

Office Action received for Chinese Patent Application No. 202080070496.3 mailing date Jul. 12, 2024, 8 Pages (4 Pages of English Translation and 4 Pages of Official copy).
(Continued)

*Primary Examiner* — Anshu Bhatia
(74) *Attorney, Agent, or Firm* — EMD Millipore Corporation

(57) ABSTRACT

A static mixer (100), comprising a static mixer housing, having an inlet port (120) for receiving a fluid, a channel (104) in fluid communication with the inlet port (120), a raised rib along a perimeter of the channel (104), a flow splitter for splitting the fluid into a first stream (106*a*) and a second stream (106*b*) within channels, a second flow splitter for splitting the first stream (106*a*) into a third stream (110*a*) and a fourth stream (110*b*) within channels and a third flow splitter for splitting the second stream (106*b*) into a fifth stream (110*c*) and a sixth stream (110*d*) within channels, a first T-style junction for rejoining and mixing the third stream and the fourth stream within a channel (112*a*), a second T-style junction for rejoining and mixing the fifth stream and the sixth stream within a channel (112*b*), and a third T-style junction for rejoining and mixing the streams; and a plastic film, the plastic film sealed to the raised rib,
(Continued)

forming a static mixer (100) capable of mixing the fluid while remaining in a state of laminar flow.

8 Claims, 6 Drawing Sheets

(56) References Cited

U.S. PATENT DOCUMENTS

| | | | |
|---|---|---|---|
| 2011/0176965 | A1 | 7/2011 | Castro et al. |
| 2011/0192217 | A1 | 8/2011 | Choikhet et al. |
| 2019/0070571 | A1 | 3/2019 | Jackson et al. |

FOREIGN PATENT DOCUMENTS

| | | | |
|---|---|---|---|
| JP | 2005-077397 | A | 3/2005 |
| JP | 2006-239638 | A | 9/2006 |
| JP | 2007-050340 | A | 3/2007 |
| JP | 2008-157644 | A | 7/2008 |
| JP | 2008-246283 | A | 10/2008 |
| JP | 2014-168752 | A | 9/2014 |
| WO | 2006/031058 | A1 | 3/2006 |
| WO | 2017/117647 | A1 | 7/2017 |
| WO | 2021/105153 | A1 | 6/2021 |

OTHER PUBLICATIONS

First Examination Report received for Indian Application No. 202217025550 mailed on Aug. 1, 2022, 5 Pages.

Invitation to Respond to Written Opinion received for Singapore Application No. 11202202653T, mailing date Aug. 26, 2024, 8 Pages.

Communication pursuant to Article 94(3) EPC received for European Patent Application No. 20808450.9 mailing date Oct. 31, 2023, 5 Pages.

International Search Report and Written Opinion for International Application No. PCT/EP2020/083272, dated Feb. 23, 2021, 12 pages.

Office Action received for Japanese Patent Application No. 2022-528231 mailing date Jun. 13, 2023, 8 Pages (4 Pages of English Translation and 4 Pages of Official copy).

Office Action received for Chinese Patent Application No. 202080070496.3 mailing date Aug. 24, 2023, 12 Pages (5 Pages of English Translation & 7 Pages of Official Copy).

Office Action received for Korean Patent Application No. 10-2022-7017620 mailing date Feb. 26, 2024, 5 Pages (1 Page of English Translation & 4 Pages of Official copy).

Office Action received for Chinese Patent Application No. 202080070496.3 mailing date Jan. 25, 2024, 8 Pages (4 Pages of English Translation and 4 Pages of Official copy).

International Preliminary Report on Patentability received for PCT Application No. PCT/EP2020/083272 mailing date Jun. 9, 2022, 9 Pages.

Office Action received for Singapore Patent Application No. 11202202653T mailing date Sep. 7, 2023, 7 Pages.

Office Action received for Korean Patent Application No. 10-2022-7017620 mailing date Aug. 7, 2023, 15 (7 Pages of English translation & 8 Pages of official copy).

* cited by examiner

MULTI-BRANCH STATIC MIXERS

RELATED APPLICATIONS

The application is a U.S. National Stage application of International Application No. PCT/EP2020/083272, filed Nov. 25, 2020, which claims the benefit of EP Priority Application Ser. No. 19/306,541.4, filed Nov. 29, 2019, each of which is incorporated by reference in its entirety.

BACKGROUND

Field of the Disclosure

This disclosure relates to the mixing of fluids. More particularly, embodiments of the mixers and methods for mixing relate to static mixers capable of mixing small amounts of fluids.

DESCRIPTION OF THE PRIOR ART

Biological fluids are mixed in solutions in the bioprocessing industry. Homogeneous mixing is a particular goal. Processes include cell culturing and other bioprocessing, such as the production of desired products, e.g., the inactivation of viruses for use in plant and animal-based cells. However, the use of high shear rates, i.e., turbulent flow, can damage components of the biological fluids, e.g., cells, viruses, capsids, monoclonal antibodies, and the like. Accordingly, static mixers are used. However, mixing small amounts of fluids and/or solids with static mixers is challenging. Moreover, mixing small amounts of fluids and/or solids homogeneously, particularly when flow rates are low and/or intermittent, is especially difficult.

Small flow rates occur when the amount of fluid to be mixed is so small that it drips into a system. The fluid (or solid) may be injected as a "droplet." The dominant fluid, flowing at a higher rate, i.e., the dominant amount of fluid only sees the lesser fluid intermittently or punctually, in other words, "packs" of the dominant fluid flows without any contact with the lesser fluid. Homogeneous mixing of the dominant fluid and the lesser fluid can only take place with a very long diffusion process. In this context, the term long can indicate a long duration of time and/or mixing within a long physical conduit or mixing system, which is not favorable.

Static mixers generally consist of baffles having a fixed position within a conduit or pipe. The baffles are helical or grid elements within the conduit or pipe. The conduit is typically part of a closed system having fluid flow therethrough. Such mixers are less efficient for laminar flows and are incapable of mixing fluids whose flow rates are not continuous.

A new static mixer, which can quickly and thoroughly mix two or more fluids despite significant differences in flow rates, and a new static mixer that can efficiently mix two or more fluids during low and/or intermittent flow would represent advance(s) in the art.

SUMMARY OF SOME EMBODIMENTS

A static mixer, comprising a static mixer housing, having an inlet port capable of receiving a plurality of fluids, a channel in fluid communication with the inlet port, at least one channel, a plurality of flow splitters within the at least one channel for splitting a fluid flow, and a plurality of T-style junctions for rejoining and mixing the fluid flow. A static mixer, comprising a static mixer housing, having an inlet port for receiving a fluid, a channel in fluid communication with the inlet port, a raised rib along a perimeter of the channel, a flow splitter for splitting the fluid into a first stream and a second stream within channels, a second flow splitter for splitting the first stream into a third stream and a fourth stream within channels and a third flow splitter for splitting the second stream into a fifth stream and a sixth stream within channels, a first T-style junction for rejoining and mixing the third stream and the fourth stream within a channel, a second T-style junction for rejoining and mixing the fifth stream and the sixth stream within a channel, and a third T-style junction for rejoining and mixing the streams; and a plastic film, the plastic film sealed to the raised rib, forming a static mixer capable of mixing the fluid(s).

In some embodiments according to the disclosure, the static mixers disclosed herein mix two or more fluids wherein one or more of the fluids is introduced in droplets to a fluid stream, optionally intermittently or continuously.

In some embodiments according to the disclosure, the static mixers disclosed herein mix acids, bases, and/or buffers with a biological product or biological fluid. In some embodiments, the static mixers disclosed herein are used for low pH virus in activation bioprocessing. In this context, low pH means a pH from 5.0 to 6.0. In some embodiments, a low pH means from 3.0 to 7.0.

In some embodiments, static mixer(s) described herein can efficiently mix two or more fluids. In some embodiments, a fluid flow of at least one fluid is discontinuous, intermittent, and/or "dripping" into a second fluid, wherein the flow of either or both fluids is low and/or intermittent and/or laminar.

In some embodiments, static mixer(s) described herein can efficiently mix two or more fluids of widely differing flow rates for purposes of inline virus inactivation processes as are known to those in the art.

These and other provisions will become clear from the description, claims, and figures below. Various benefits, aspects, novel and inventive features of the present disclosure, as well as details of exemplary embodiments thereof, will be more fully understood from the following description and drawings. So the manner in which the features disclosed herein can be understood in detail, more particular descriptions of the embodiments of the disclosure, briefly summarized above, may be had by reference to the appended drawings. It is to be noted, however, that the appended drawings illustrate only typical embodiments of this disclosure and are therefore not to be considered limiting of its scope, for the described embodiments may admit to other equally effective static mixers. It is also to be understood that elements and features of one embodiment may be found in other embodiments without further recitation and that, where possible, identical reference numerals have been used to indicate comparable elements that are common to the figures. As used herein, the singular forms "a," "an," and "the" include plural referents unless the context clearly dictates otherwise. Unless defined otherwise, all technical and scientific terms used herein have the same meaning as commonly understood by one of ordinary skill in the art to which these embodiments pertain. Also, the following terms used herein are subject to the following definitions, unless the context indicates otherwise.

DETAILED DESCRIPTION

Figure 1:
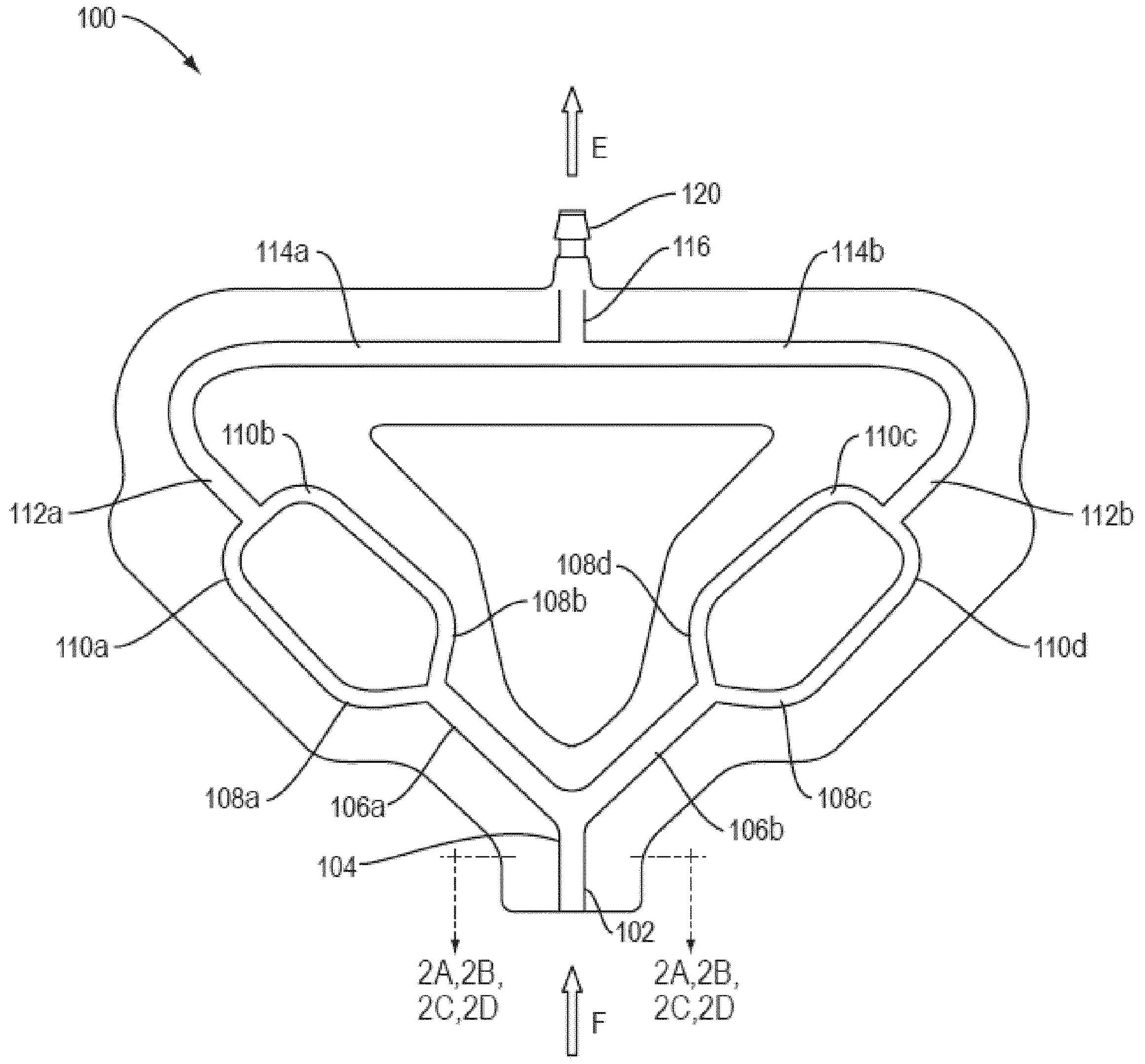
FIG. 1 depicts a top view of a static mixer housing, according to embodiments of the present disclosure.
Figure 2A:
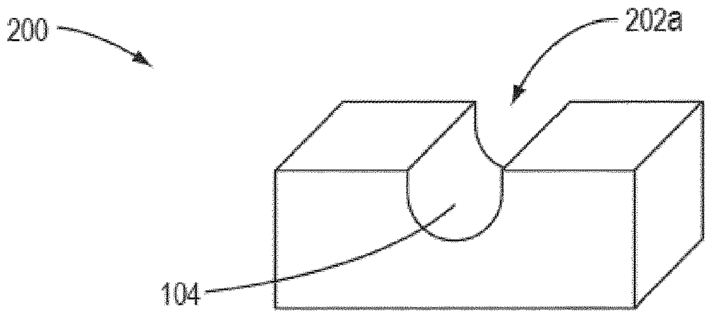
FIG. 2 depicts a top perspective view of a cross section taken along line 2-2 of the static mixer housing of FIG. 1, according to embodiments of the present disclosure.
Figure 2B:
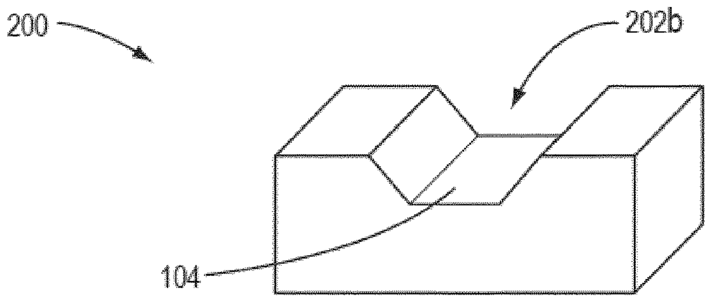
Figure 2C:
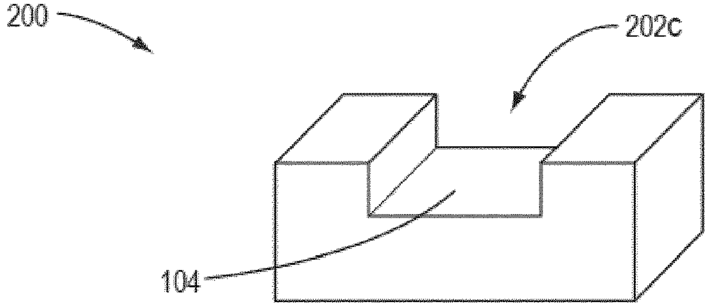
Figure 2D:
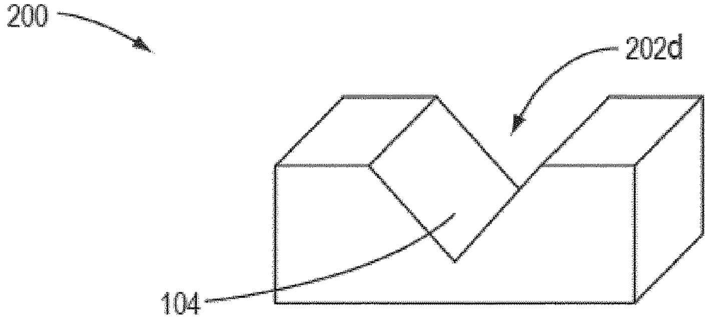

FIG. 1 depicts a top view of a static mixer housing 100, according to embodiments of the present disclosure. FIG. 1 shows a primary inlet channel 102 disposed on the static mixer housing 100, wherein fluid flow F flows into the static mixer housing 100. It is to be understood that a port, such as a barbed port, may be connected to the inlet channel 102. In some embodiments, the barbed port further comprises a Y-type connector or a T-type connector for connection with the inlet channel 102, either of which may have tubing attached thereto for the supply of two differing fluid components to be mixed. In some embodiments, the barbed port has a single port connected to tubing to supply a fluid, wherein the fluid contains more than one fluid component for subsequent mixing. The primary inlet channel 102 splits at branch 104 after receiving the fluid flow from the inlet 102. As shown, the branch 104 is a Y-type split, wherein the split forms an acute angle. It is contemplated that the branch 104 may be a different style, such as a T-type branch. The fluid flow thereafter splits into two secondary channels 106*a*, 106*b*. As shown, each of the secondary channels form a 45° angle with the primary channel 104, although angles of 10°, 20°, 30°, 60°, 70°, etc., are also contemplated as being within the scope of the disclosure. Nonetheless, other angles are contemplated as within the scope of the technology. Thereafter, the secondary channel 106*a* splits, again shown as a Y-type branch, into tertiary channels 108*a*, 108*b*. As above, any acute angle is contemplated herein. The tertiary channels 108*a*, 108*b* next form roughly perpendicular angles at points 110*a*, 100*b*, whereupon they rejoin, creating a mixing action. Without intending to be bound by theory, it is believed that the fluids within 110*a* and 110*b*, because of the termination at a T-style junction 112*a*, mix efficiently compared with other joints.

Similar as to with respect to the secondary channel 106*a*, the secondary channel 106*b* splits, again shown as a Y-type branch, into tertiary channels 108*c*, 108*d*. The tertiary channels 108*c*, 108*d* next form roughly perpendicular angles at points 110*c*, 100*d*, whereupon they rejoin, creating a mixing action at a T-style junction 112*b*. The two terminal channels, 114*a*, 114*b*, which follow after the T-style junctions, 112*a*, 112*b* respectively, then join into a T-style junction 116, causing yet additional mixing. The fluid inside the static mixer 100 can then exit, fully mixed, via exit port 120.

As shown, the size of the channels, i.e., inner diameters, 104, 106*a*, 106*b*, 108*a*, 108*b*, 108*c*, 108*d*, 110*a*, 110*b*, 110*c*, 110*d*, 112*a*, 112*b*, 114*a*, 114*b*, 116 are substantially similar. However, this is need not be the case, as is discussed below.

FIG. 2 depicts a top perspective view 200 of a cross section taken along line 2-2 of the static mixer housing of FIG. 1, according to embodiments of the present disclosure. FIG. 2A depicts a perspective view wherein the geometry of the channel 104 comprises a semi-circular shape 202*a*, which would be taken along a line 2A-2A. FIG. 2B depicts a perspective view wherein the geometry of the channel 104 comprises a trapezoidal shape 202*b*, which would be taken along a line 2B-2B. FIG. 2C depicts a perspective view wherein the geometry of the channel 104 comprises a rectangular shape 202*c*, which would be taken along a line 2C-2C. FIG. 2D depicts a perspective view wherein the geometry of the channel 104 comprises a chevron shape 202*d*, which would be taken along a line 2D-2D. It is to be understood that two similar static mixer housings 100, e.g., each having semi-circular channel 104, each having a trapezoidal channel 104, each having a rectangular channel 104, or each having a chevron channel 104, may be welded or otherwise adhered together to form a static mixer.

Figure 3B:
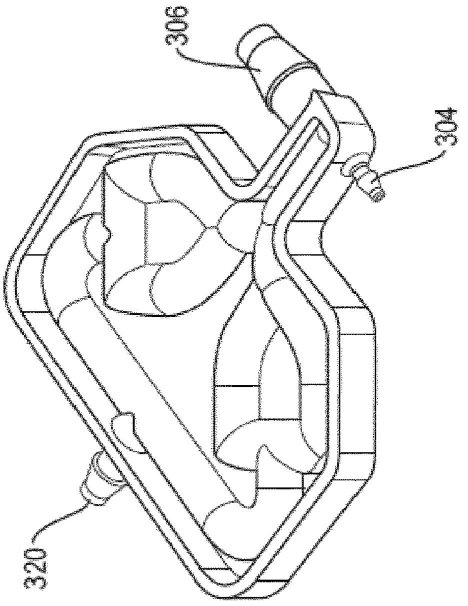
FIG. 3 depicts an exploded view of a top perspective view of the static mixer housing of FIG. 1, a film for bonding to the static mixer housing, and a back view of the static mixer housing 100, according to embodiments of the disclosure.
Figure 3A:
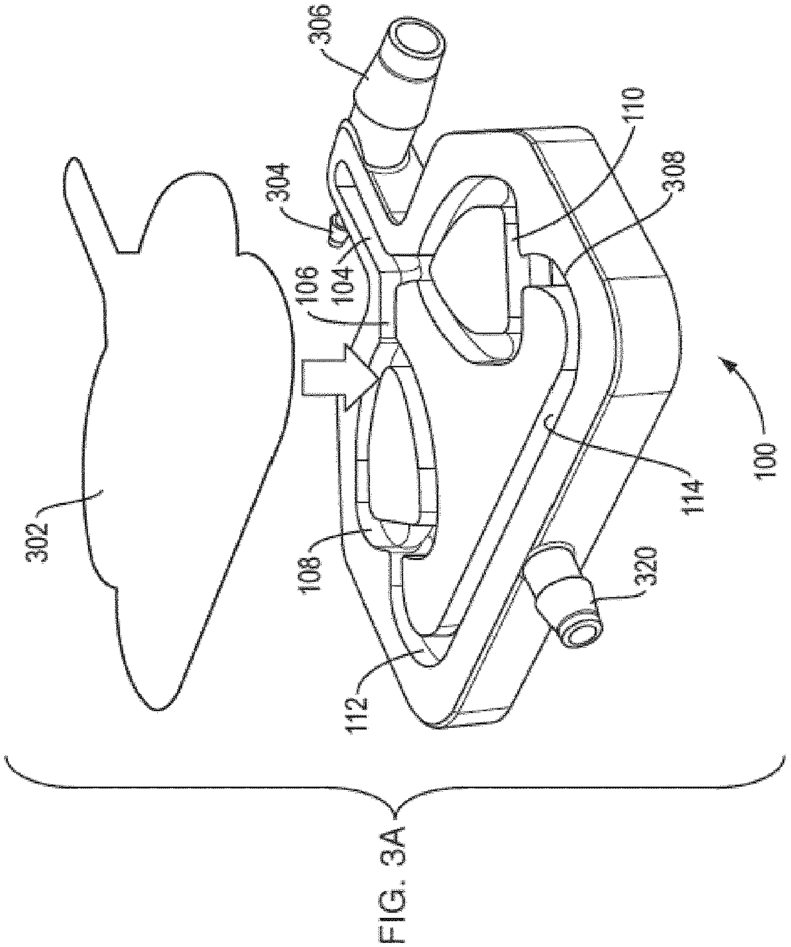

FIG. 3A depicts an exploded view of a plastic sheet 302 and an upper perspective view of the static mixer housing 100 of FIG. 1. The plastic sheet 302 may be nearly any polymeric material that is sterilizable with heat, gamma radiation, alcohols, or the like, such as polyethylene, silicon, nylon, polyethylene terephthalate, biaxially-oriented polyethylene terephthalate, biaxially-oriented polypropylene, polyether sulfone, copolymers and blend thereof, and other suitable materials. The plastic sheet 302 may be diecut, laser cut or otherwise formed in a shape that roughly corresponds with the perimeter of the static mixer housing 100. The plastic sheet 302 is adhered to the static mixer housing 100 via heat and pressure, adhesives, and other joining methods known to those in the art. As shown, the static mixer housing 100 has a large inlet port 306 for a main biological fluid and a small inlet port 304 for delivering a small amount of a fluid, such as a buffer, to the main biological fluid. A medium-sized outlet port 320 is also depicted. The outlet port 320 has a smaller inner diameter than the large inlet port 306, which may provide back pressure, increasing fluid residence times and limiting the amount of turbulence within the static mixer. In practice, any sized outlet port 320 may be used, irrespective of the size of the channels. It is to be further understood that any and all inlet ports 304, 306 may be the same size as any outlet port 320.

A raised rib 308 is shown on all perimeters of the channels 104, 106, 108, 110, 112, 114 for heat staking or bonding with the plastic sheet 302. The raised rib 308 fuses with the plastic sheet 302 during a heat bonding operation. The static mixer housing 100 may be made of any suitable plastic material. For example, the static mixer housing 100 may be made of high-density polyethylene (HDPE), acrylonitrile-butadiene-styrene (ABS), nylon 6, nylon 66, nylon 46, polyether sulfone and other sterilizable polymers typically used in the bioprocessing industry. The static mixer housing 100 may be manufactured using, for example, injection molding processes. The static mixer housing 100 may also be manufactured by milling channels into a plastic sheet or using lasers and/or other ablating methods. It is to be understood that some embodiments of any static mixer housing described herein may comprise a rib 308 and some embodiments may have no rib 308. In some embodiments, two static mixer housings may be adhered together to form a static mixer. Such embodiments may not comprise a raised rib 308. FIG. 3B depicts a back view of the static mixer housing 100 shown in FIG. 3A.

Figure 4:
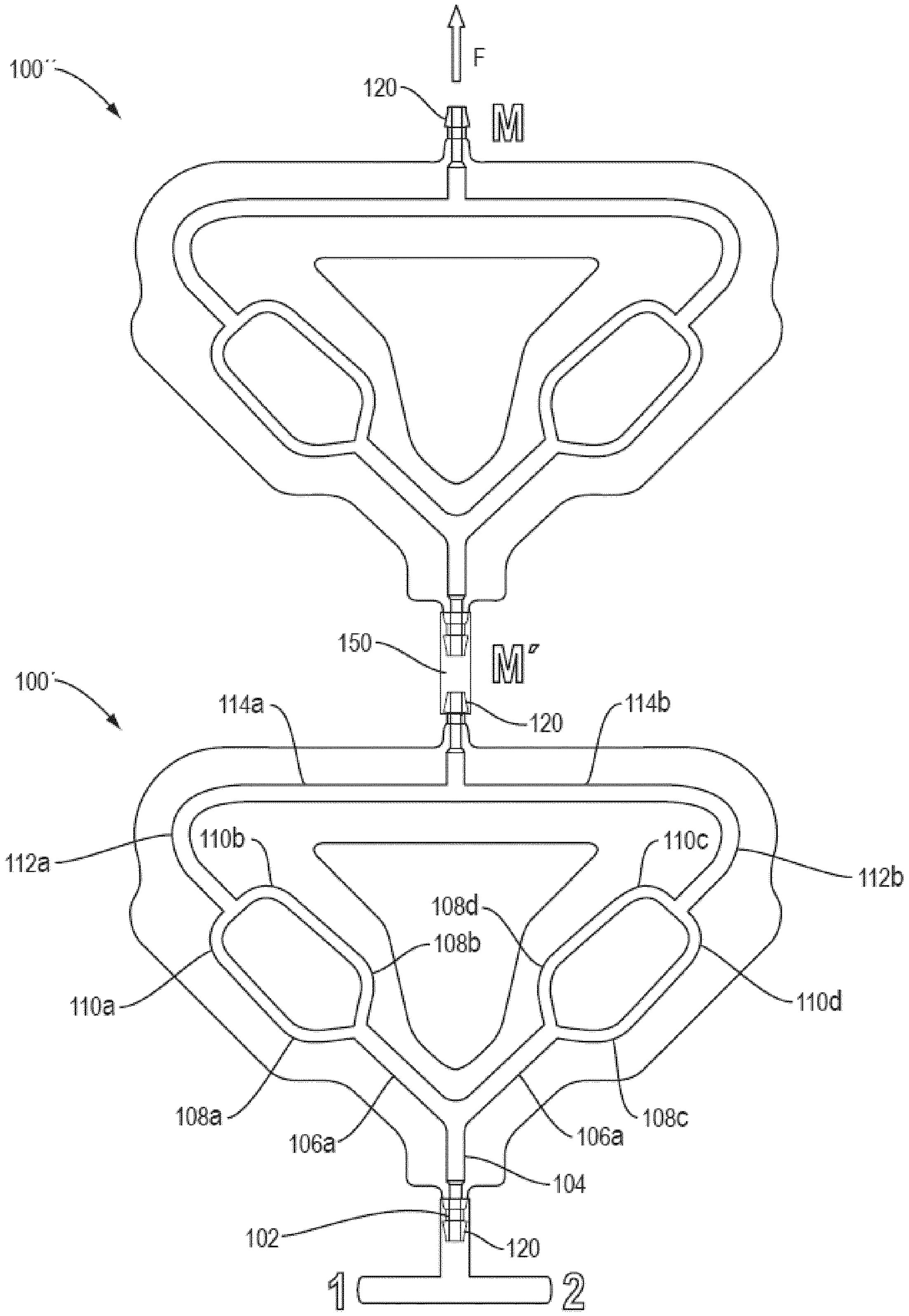
FIG. 4 depicts a dual system, comprising two static mixers of FIG. 3 connected in series, according to some embodiments of the disclosure.

FIG. 4 depicts a dual system 400, comprising two static mixers 100 of FIG. 3 connected in series, according to some embodiments of the disclosure. A first static mixer 100' is connected with a second static mixer 100" at junction M', which may be a tubular connector 150. Fluid is introduced into the static mixer 100' at Port 1 and Port 2. Port 1 may have a fluid delivered in a low fluid flow condition to the entry port 120. Port 2 may have a fluid delivered in a relatively high fluid flow condition to the entry port 120. The two fluids are then mixed, similarly as described above, within a static mixer 100'. The two fluids, mixed, next flow out of exit port 120. Thereafter, the fluids are further mixed in the static mixer 100" and out exit port 120 at point F. Although two static mixers 100' and 100" are shown, it is to be understood that any practical number of static mixers 100 may be connected in series and/or in parallel (not shown). It is also to be understood that connector 150 may comprise an inlet to add yet additional fluid. The additional fluid may be one of the two fluids added at port 1 and port 2 or may be a third fluid.

Figure 5:
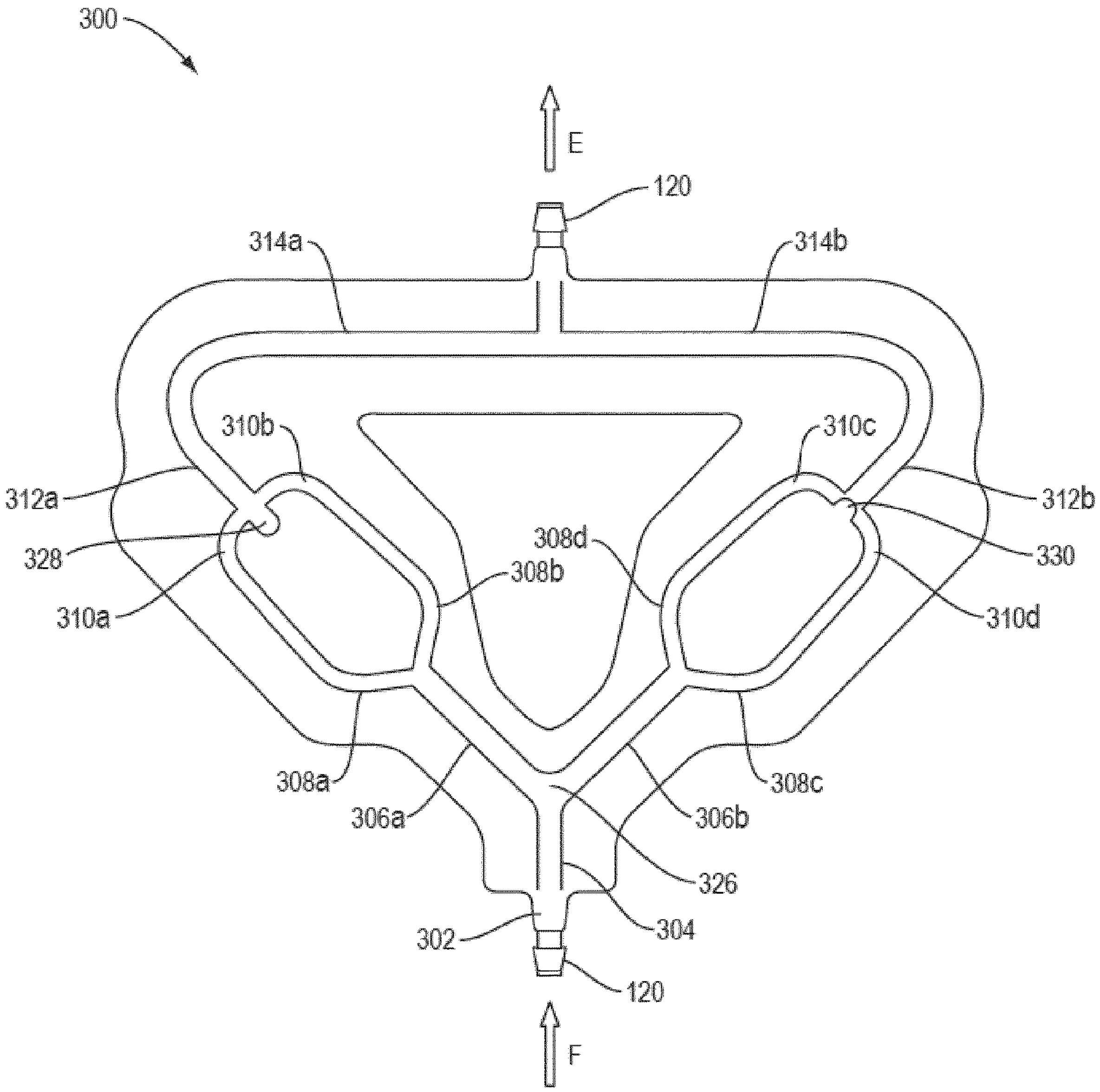
FIG. 5 depicts a second static mixer housing, according to some embodiments of the disclosure.

FIG. 5 depicts a second static mixer housing 300, according to some embodiments of the disclosure. The second static mixer housing 300 is similar to the static mixer 100, described above. The second static mixer housing 300 has optional features. For example, the second static mixer housing 300 may comprise a radiused inflection 326 adjacent to an inlet channel 302. The radiused inflection 326 may promote mixing. The second static mixer housing 300 may further comprise a concave nub 328. As shown, the nub 328 is points 310*a*, 310*b*, where they rejoin, creating a mixing action at a T-style junction 312*a*. The second static mixer housing 300 may further comprise a convex nub 330. As shown, the convex nub 330 is at points 310*c*, 310*d*, where they rejoin, creating a mixing action at a T-style junction 312*b*. It is to be further understood that the radiused inflection 326, concave nub 328, and/or convex nub 330 may be present (or omitted) from any Y-style split or T-style junction.

Also, the size of the channels, i.e., inner diameters or dimensions, 304, 306*a*, 306*b*, 308*a*, 308*b*, 308*c*, 308*d*, 310*a*, 310*b*, 310*c*, 310*d*, 312*a*, 312*b*, 314*a*, 314*b*, 316 differ in the static mixer housing 300. For example, the cross-sectional area of channels 308*a*, 308*b* are larger than channel 306*a*. In some embodiments, the cross-sectional area of channels 308*a*, 308*b* are smaller than channel 306*a*. As above, the second static mixer housing 300 have a plastic film applied thereto to form a static mixer or any two similar static mixers 300 may be adhered together.

Figure 6:
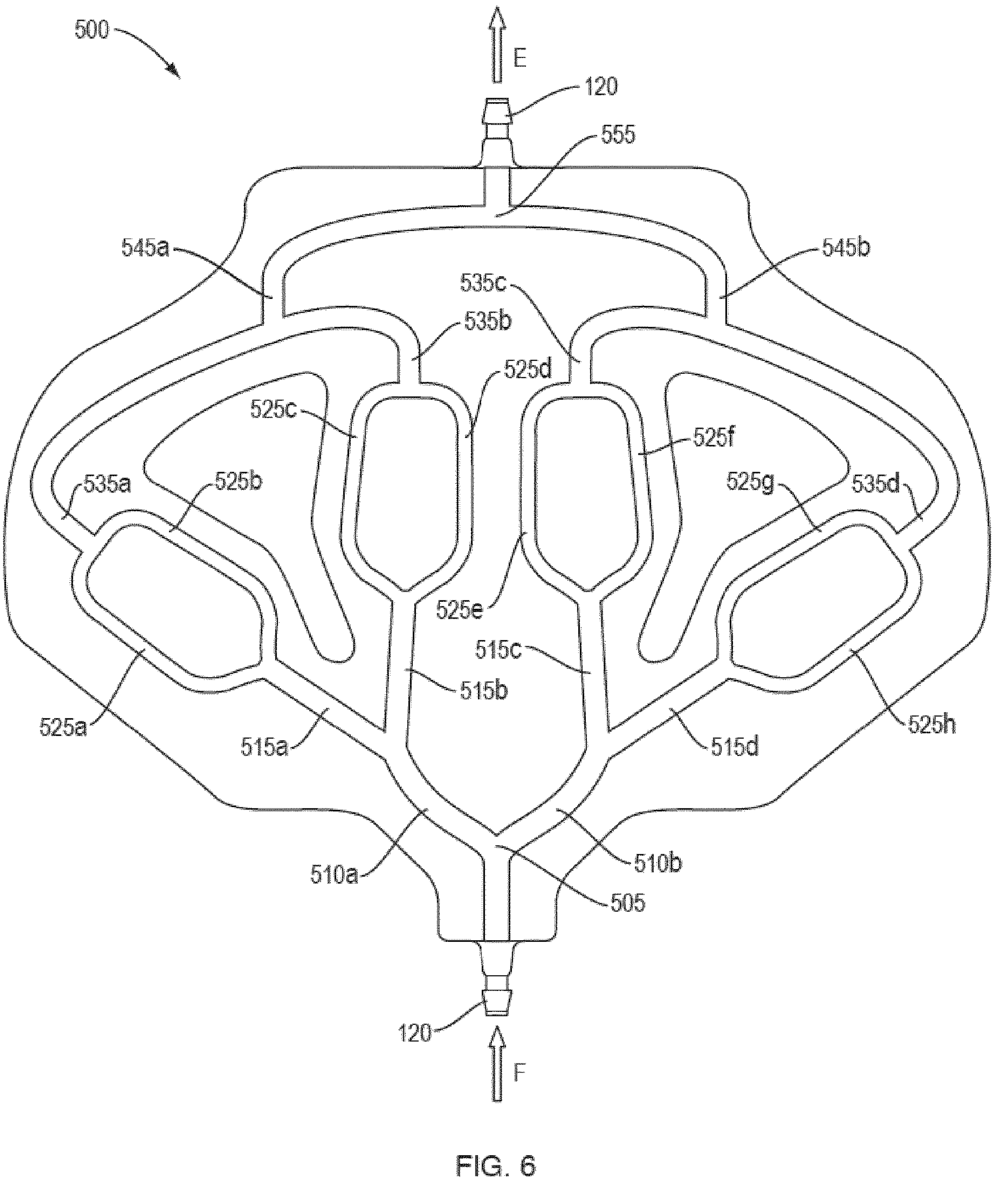
FIG. 6 depicts a third static mixer housing having seven T-style junctions, according to embodiments of the disclosure.

FIG. 6 depicts a third static mixer housing 500 having seven T-style junctions 535*a*, 535*b*, 535*c*, 535*d*, 545*a*, 545*b*, 555, according to embodiments of the disclosure. In practice, any suitable number of splitters and junctions may be used. The third static mixer housing 500 operates similarly to the static mixers and systems described above. A fluid, comprising two or more components for mixing, enters the third static mixer housing 500 at point F via the port 120. The fluid flow is then split into two secondary streams 510*a* and 510*b* at a Y-split 505. The stream 510*a* is then split into tertiary streams 515*a* and 515*b* at a Y-split. The tertiary stream 515*a* is then split into quaternary streams 525*a* and 525*b* at another Y-split. The quaternary streams 525*a* and 525*b* are then rejoined at a T-style junction 535*a*, wherein mixing occurs as described above. A stream 535*b* from the 515*b* stream (having undergone similar splitting and rejoining with respect to the 515*a* stream) is then rejoined at a T-style junction 545*a*. The 510*b* stream is split and rejoined similarly to the 510*a* stream, creating a mixed stream at T-style junction 545*b*. The streams 545*a*, 545*b* are then mixed again when joined at T-style junction 555. The one stream then exits from a port 120 at point E. In sum, the one stream entering the third static mixer housing 500 was split into eight separate streams and re-joined into one mixed stream. It is to be understood that the third static mixer housing 500 can contain any or all of the features described above with respect to mixers 100, 100', 100", and 300. The static mixer housing 500 may have a rib 308, may have a radiused inflection 326, may have a concave nub 328, a convex nub 330, a plastic film 302 or have two static mixer housing 500 mated to form a static mixer. Also, any of the size differences described in FIG. 5 similarly apply. Furthermore, the static mixer housings 500 may be placed in series or in parallel to form mixing systems.

All ranges for formulations recited herein include ranges therebetween and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4, or 3.1 or more.

Reference throughout this specification to "one embodiment," "certain embodiments," "one or more embodiments," "some embodiments," or "an embodiment" indicates that a feature, structure, material, or characteristic described in connection with the embodiment is included in at least one embodiment of the disclosure. Therefore, the appearances of the phrases such as "in one or more embodiments," "in certain embodiments," "in one embodiment," "some embodiments," or "in an embodiment" throughout this specification are not necessarily referring to the same embodiment. Nonetheless, it is to be understood that any feature described herein can be incorporated within any embodiment(s) disclosed herein.

Publications of patent applications and patents and other non-patent references, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

What is claimed is:

1. A static mixer, comprising:

a static mixer housing, comprising, an inlet port for receiving a fluid, a primary channel in fluid communication with the inlet port, a raised rib along a perimeter of the primary channel, a first flow splitter for splitting the fluid into a first stream and a second stream within a first secondary channel and a second secondary channel, respectively, a second flow splitter for splitting the first stream into a third stream and a fourth stream within a first tertiary channel and a second tertiary channel, respectively, and a third flow splitter for splitting the second stream into a fifth stream and a sixth stream within a tertiary channel and a fourth tertiary channel, respectively, a first T-style junction for rejoining and mixing the third stream and the fourth stream within a first terminal channel, a second T-style junction for rejoining and mixing the fifth stream and the sixth stream within a second terminal channel, and a third T-style junction for rejoining and mixing the streams; and a plastic film, the plastic film sealed to the raised rib, forming the static mixer capable of mixing the fluid.

2. The static mixer of claim 1, wherein the primary channel, the first secondary channel, the second secondary channel, the first tertiary channel, the second tertiary channel, the first terminal channel, and the second terminal channel comprise one of a semi-circular geometry, a trapezoidal geometry, a rectangular geometry, or a chevron geometry.

3. The static mixer of claim 1, further comprising additional T-style junctions.

4. The static mixer of claim 3, further comprising additional flow splitters.

5. The static mixer of claim 4, wherein the first flow splitter and the second flow splitter are Y-style splitters.

6. The static mixer of claim 1, further comprising a port having at least two inlet ports.

7. The static mixer of claim 1, wherein the primary channel, the first secondary channel, the second secondary channel, the first tertiary channel, the second tertiary channel, the first terminal channel, and the second terminal channel have a constant inner dimension.

8. The static mixer of claim 1, wherein the primary channel, the first secondary channel, the second secondary channel, the first tertiary channel, the second tertiary channel, the first terminal channel, and the second terminal channel have inner dimensions that are not constant in size.

* * * * *